Aug. 30, 1966 SATOSHI SHIMADA ETAL 3,270,129

COLOR TELEVISION REPRODUCING SYSTEM

Filed Oct. 25, 1963 3 Sheets-Sheet 1

Inventors
Satoshi Shimada
Tetsuo Tokita
Yasunori Takahashi by Hill, Sherman, Meroni, Gross & Simpson Attys.

COLOR TELEVISION REPRODUCING SYSTEM

Filed Oct. 25, 1963

3 Sheets-Sheet 2

Inventors
Satoshi Shimada
Tetsuo Tokita
Yasunori Takahashi by Hill, Sherman, Meroni, Gross & Simpson Attys.

COLOR TELEVISION REPRODUCING SYSTEM

Filed Oct. 25, 1963 3 Sheets-Sheet 3

Inventors
Satoshi Shimada
Tetsuo Tokita
Yasunori Takahashi by Hill, Sherman, Meroni, Gross & Simpson Attys.

United States Patent Office 3,270,129

Patented August 30, 1966

3,270,129

COLOR TELEVISION REPRODUCTION SYSTEM

Satoshi Shimada, Ohta-ku, Tokyo, Tetsuo Tokita, Shinagawa-ku, Tokyo, and Yasunori Takahashi, Musashino-shi, Tokyo, Japan, assignors to Sony Corporation, Shinagawa-ku, Tokyo, Japan, a corporation of Japan Filed Oct. 25, 1963, Ser. No. 319,056

Claims priority, application Japan, Oct. 31, 1962, 37/49,112

9 Claims. (Cl. 178—5.4)

This invention relates to a color television reproducing system and more particularly to a system wherein a three phase color control signal is applied to grids of a post deflection focusing type tube in a manner to obtain an image having clear and distinct colors with high brightness and high resolution.

Color television systems are known which use post deflection focusing or Chromatron type reproducing tubes, wherein parallel grid elements are placed adjacent red, green and blue phosphor strips of a fluorescent screen. A two grid system has been used extensively wherein the strips are arranged in the order red-green-red-blue-red green-red-blue . . . , and wherein the grid elements are disposed adjacent alternate strips. Such two grid systems have been generally satisfactory but they have certain disadvantages, particularly with respect to obtaining highly saturated and accurate colors.

A three grid system has also been proposed, wherein red, green and blue phosphor strips are respectively disposed adjacent the grid elements of three grids, a three phase signal being applied to the three grids. With the proposed three grid system, it is necessary to interpose non-functioning strips of substantial width between the phosphor strips in order to approach the production of accurate colors, and the efficiency of the tube is greatly reduced, with a marked reduction in brightness and resolution.

According to an important feature of this invention, a three grid system is provided in which the phosphor strips occupy substantially the entire area of the fluorescent screen, with minimum inactive areas, to produce high resolution and efficiency, the strips being also arranged in relation to the elements of the grids in a manner to obtain accurate color reproduction. Preferably, the elements and phosphor strips are arranged to produce colors in the sequence red-white-green-white-blue-white-red-white-green-white-blue-white . . . in response to application of a three phase color control signal to the three grids. It should be noted that although the invention is described and illustrated herein with reference to a three grid system, the principles of the invention can be carried forward and applied to systems having four or more grids, and reference to three grids herein and in the claims should not be construed as excluding a system having additional grids. In addition, the color sequences described and illustrated herein are intended as being illustrative and not as limiting the invention specifically thereto.

Another important feature of the invention relates to the application of a keying signal to the electron gun of the reproducing tube in a manner to reduce the intensity of the beam during the white portions of each cycle of the color control signal, so as to permit the production of highly saturated colors.

A further feature of the invention relates to the modulation of the amplitude of the keying signal in proportion to chrominance components of a color television signal, in a manner to permit reproduction of highly saturated colors, while also obtaining high efficiency, brightness and resolution with respect to black and white components.

Other important features of the invention reside in a particular arrangement of the grid elements and phosphor strips, and in circuit arrangements for applying the three phase control signals and the keying signals.

These and other objects, features and advantages of the invention will become more fully apparent from the following detailed description taken in conjunction with the accompanying drawings which illustrate preferred embodiments and in which.

Figure 1:
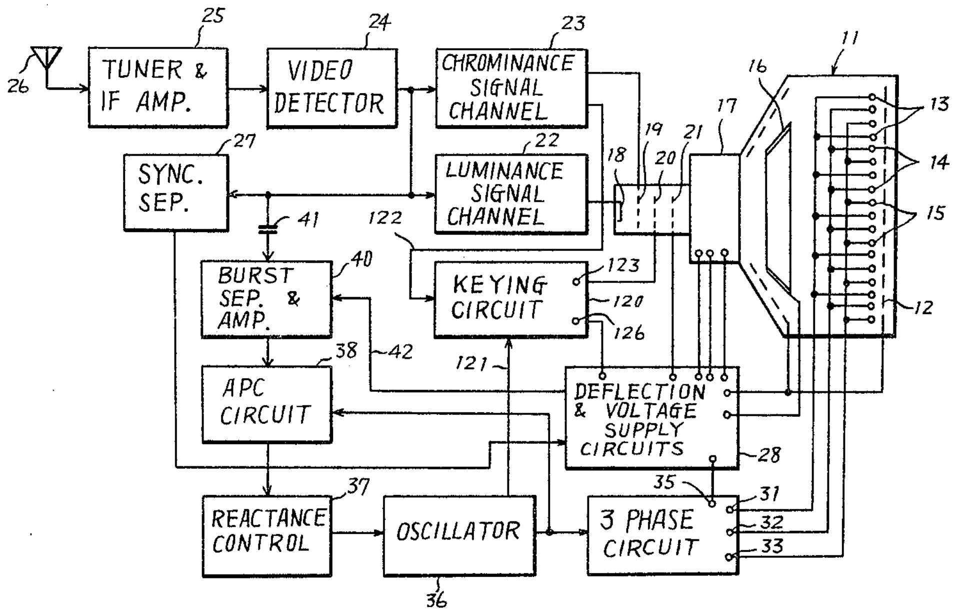
FIGURE 1 is a schematic diagram illustrating a color television reproducing system constructed according to the principles of this invention.

Referring to FIGURE 1, reference numeral 10 generally designates a color television reproducing system constructed according to the principles of this invention. The system 10 is particularly designed for receiving and reproducing signals of the NTSC system, but it will be understood that it has other applications. In general, the system 10 comprises a cathode ray reproducing tube 11 of a post deflection focusing type having a fluorescent screen 12 composed of red, green and blue phosphor strips, and three grids 13, 14 and 15 having elements adjacent the screen 12 for controlling the impingement of an electron beam on the screen 12 to control color. The tube 11 further includes an acceleration electrode 16, a deflection coil assembly 17 and an electron gun including a cathode 18, a control grid 19, an accelerating grid 20 and a focus control grid 21.

The cathode 18 is connected to the output of a luminance signal channel 22 while the control grid 19 is connected to the output of a chrominance signal channel 23, inputs of the channels 22 and 23 being connected to the output of a video detector 24 which in turn is connected to the output of a tuner and IF amplifier circuit 25 connected to an antenna 26.

The output of the video detector 24 is also applied to a synchronizing signal separating circuit 27 which applies a signal to a deflection and voltage supply circuit 28 having a terminal connected to the grid 21, additional terminals connected to the deflection coil assembly 17, a high voltage terminal connected to the screen 12 and a medium voltage terminal connected to the electrode 16.

The construction and operation of the synchronizing signal separating circuit 27 and the deflection and voltage supply circuit 28 are, of course, well known in the art and it will be understood that an electron or cathode ray beam produced by the elements 18–21 and accelerated under the influence of the high voltages applied to the screen 12 and the electrode 16 is caused to periodically scan the screen 12 under the influence of the deflecting fields produced by the deflection coil assembly 17.

The instantaneous color produced as the beam impinges on the screen 12 is controlled from components of a color control signal applied to the grids 13, 14 and 15 from terminals 31, 32 and 33 of a three phase circuit 34. Circuit 34 has a terminal 35 connected to a terminal of the deflection and voltage supply circuits 28 and has an input connected to the output of an oscillator 36 which may preferably be operated at a frequency of 3.58 megacycles. The operation of the oscillator 36 is synchronized with a color burst component of the video signal in a manner as well known in the art. As illustrated, the oscillator 36 is controlled from a reactance control circuit 37 which is controlled from an automatic phase control circuit 38 having one input connected to the output of the oscillator 36 and having a second input connected to the output of a burst separating and amplifying circuit 40. The input of the circuit 40 is connected through a coupling capacitor 41 to the output of the video detector 24 and in conventional fashion, a gating post may be applied to the circuit 40 from the deflection and voltage supply circuit 28, through a line 42. It will be understood that the circuits 36–40 are conventional and other forms of circuits may be used.

Figures 2A, 2B, 3A, 3B, 4A, 4B, 5A, 5B:
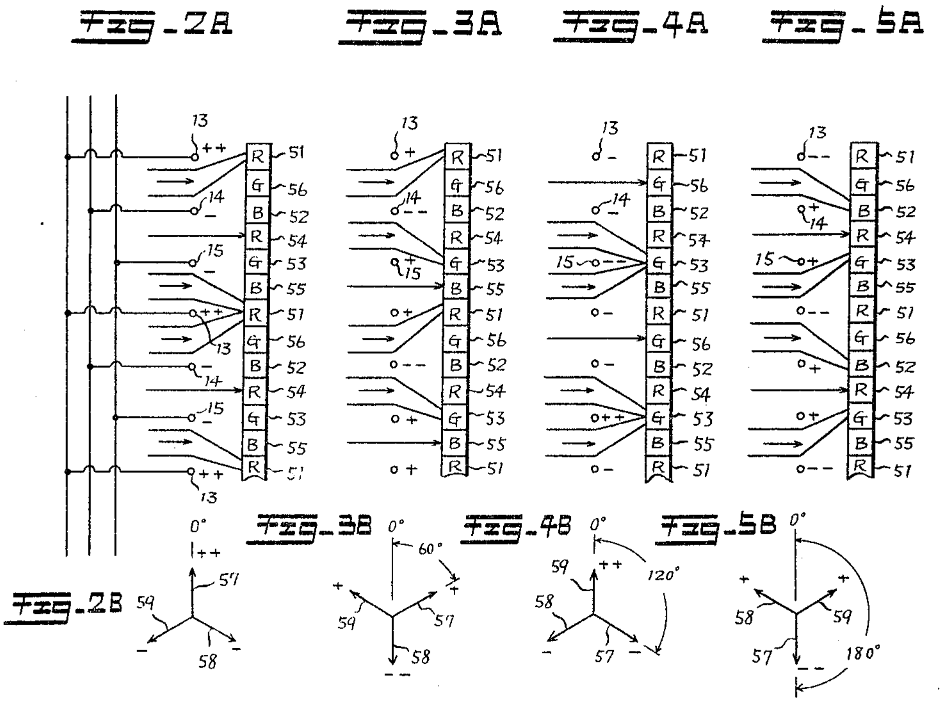
FIGURE 2A is a view illustrating schematically a portion of the screen structure of a reproducing tube of the system of FIGURE 1, and the paths taken by electrons of the beam thereof under one condition of operation.
FIGURE 2B is a diagram illustrating the vector relation of voltages applied under the condition of operation illustrated in FIGURE 2A.
FIGURES 3A, 3B, 4A, 4B, 5A, 5B, 6A, 6B, 7A and 7B are views similar to FIGURES 2A and 2B, respectively, illustrating other conditions of operation and the corresponding vector relationships.

Before further describing in detail the circuits of this invention, the construction and operation of the tube 11 will be considered. FIGURE 2A diagrammatically illustrates a portion of the screen 12 and the relationship of elements of the grids 13, 14 and 15 thereto. As illustrated, the grids 13, 14 and 15 have spaced parallel elements with the elements of the grid 14 being disposed intermediate the elements of the grids 13 and 15 and with the elements of the grid 15 being disposed intermediate the elements of the grids 14 and 13. The screen 12 is composed of red, green and blue strip phosphors, which may be considered as being arranged in first and second series of strip phosphors of each color. In particular, a first series of red phosphor strips 51 are disposed opposite the elements of the grid 13, a first series of blue phosphor strips 52 are disposed opposite the elements of the grid 14, and a first series of green phosphor strips 53 are disposed opposite elements of the grid 15. In addition, a second series of red phosphors 54 are disposed intermediate the blue and green phosphor strips 52 and 53 of the first series, a second series of blue phosphor strips 55 are disposed between the green and red phosphor strips 53 and 51 of the first series, and a second series of green phosphor strips 56 are disposed between the red and blue phosphor strips 51 and 52 of the first series. Stated in other words, the screen is composed of phosphor strips arranged in an order such that there are successively a red phosphor strip, a green phosphor strip, a blue phosphor strip, then another red phosphor strip and so on, while the grid elements are disposed opposite every other one of the phosphor strips with each input grid connection being connected to every third one of the grid elements and with the elements of the grids being interleaved.

A three phase signal is applied to the grids 13, 14 and 15 from the three phase circuit 34. FIGURE 2B is a vector diagram showing the phase relation of the components at the start of a cycle, wherein vectors 57, 58 and 59 represent the voltages applied to the three color control grids 13, 14 and 15. At the start of a cycle, the grid 13 is at a maximum positive voltage while the grids 14 and 15 are at voltages equal to the maximum positive voltage multiplied by the cosine of the angles of 120° and 240°, each being thereby at a negative voltage equal to one-half the maximum voltage. Under such conditions, electrons of the beam will be attracted to elements 13 and repelled from elements 14 and 15, to impinge primarily on both the red phosphor strips 51 of the first series and the red phosphor strips 54 of the second series, as illustrated in FIGURE 2A. A saturated red color is thus produced under such conditions.

FIGURES 3A and 3B show the operation and the vector relationship at a time 60° after the start of a cycle. Under such conditions, each of the elements of the grids 57 and 59 is at a positive potential equal to one-half the maximum value, while the elements of the grid 14 are at a negative voltage equal to the maximum value. Under such conditions, the electrons of the beam will be impinged on the first series of red phosphor strips 51, the first series of green phosphor strips 53 and also on the second series of blue phosphor strips 55. With balanced excitation of such strips, a white color is produced.

FIGURES 4A and 4B shows the operation and the phase relationships at a time displaced 120° from the start of a cycle, wherein the voltage applied to the grid 15 is at a maximum positive value, and the voltages applied to the grids 13 and 14 are at negative values equal to one-half the maximum value. Under such conditions, the electrons of the beam are impinged on both the green phosphor strips 53 of the first series and the green phosphor strips 56 of the second series. Accordingly, a saturated green color is produced.

Figures 6A, 7A, 8:
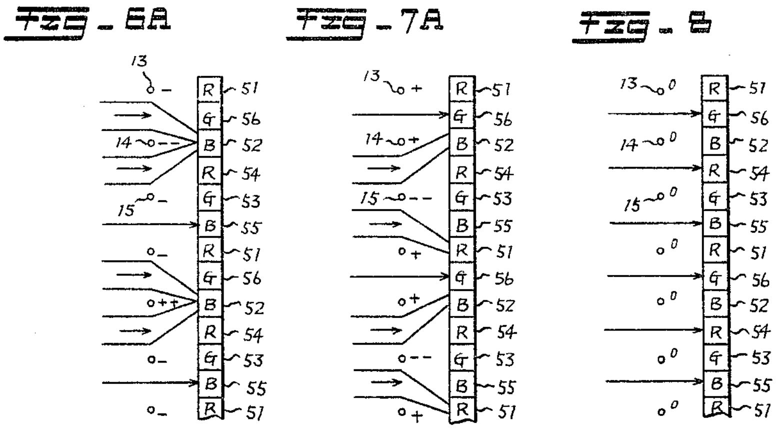
FIGURE 8 is a view similar to FIGURE 2A, illustrat- the paths taken by electrons of the electron beam under still another condition of operation.
Figures 6B, 7B:
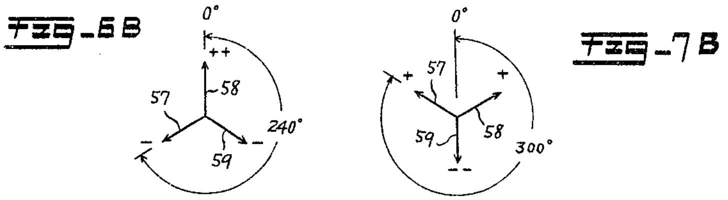

In a similar manner, FIGURES 5A and 5B, FIGURES 6A and 6B and FIGURES 7A and 7B show the operation and the phase relationships at times displaced 180°, 240°, and 300° from the start of the cycle, a white color being produced under the conditions depicted in FIGURE 5A, a saturated blue color being produced under the conditions depicted in FIGURE 6A and a white color being again produced under the conditions depicted in FIGURE 7A.

Accordingly, colors are produced in the sequence red-white - green - white - blue - white - red - white - green - white-blue-white . . . in response to application of the three phase color signal.

FIGURE 8 depicts the operation with no signals applied to the color control grids 13–15. In this case, the electrons of the beam are impinged on all strips. The strips 51, 52 and 53 of the first series may be physically blocked to some extent by the elements of the grids disposed opposite thereto, but the electrons of the beam may impinge freely upon the strips 54, 55 and 56 of the second series. Under such conditions, of course, a white color is produced and it will be appreciated that it can be produced with high efficiency, brightness and resolution, since the phosphor strips occupy substantially the entire area of the screen, with inactive areas being at a minimum. This is, of course, very important in the reproduction of monochrome television signals, as well as in obtaining the highest possible quality of reproduction of color television signals.

Figure 9:
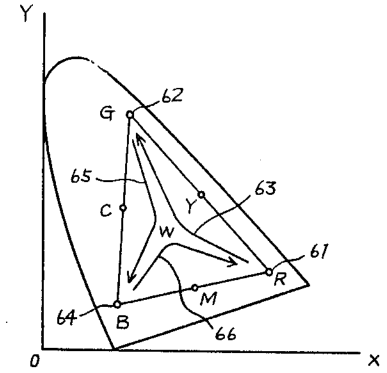
FIGURE 9 is a chromaticity diagram for explaining the operation of the system.

The above operation is illustrated in the chromaticity diagram of FIGURE 9. As illustrated, the operation moves from a red point 61 to a green point 62 along a line 63 which passes through a composite white color indicated by the letter W, thence passes from the green point 62 to a blue point 64, along a line 65 which passes through the composite white color, and thence moves from the blue point 64 to the initial red point 61 along a line 66 which passes through the composite white color W. The operation may thus be referred to as a color-sequential system wherein the operation moves radially in the chromaticity diagram.

Figure 10:
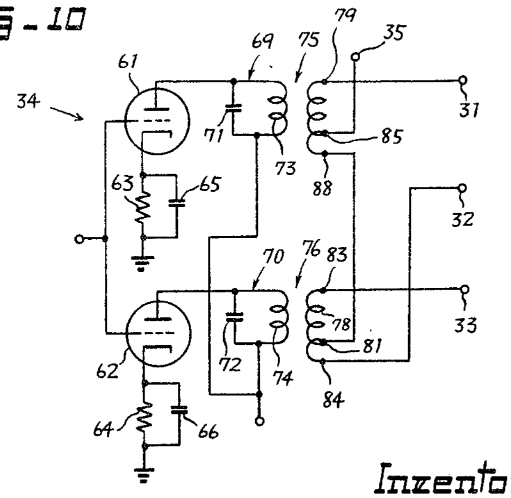
FIGURE 10 is a circuit diagram of one preferred form of three phase circuit usable in the system of FIGURE 1.

FIGURE 10 shows one preferred arrangement for the three phase circuit 34. An input signal from the oscillator 36 is applied to the grids of a pair of triodes 61 and 62 having cathodes connected to ground through bias resistors 63 and 64 and by-pass capacitors 65 and 66. The anodes of the triodes 61 and 62 are connected to a B+ power supply terminal 67 through a pair of resonant circuits 69 and 70 comprising capacitors 71 and 72 and primary windings 73 and 74 of a pair of transformers 75 and 76 having secondary windings 77 and 78. One end terminal 79 of the winding 77 is connected to the terminal 31 and an opposite end terminal 80 of the winding 77 is connected to a tap 81 of the winding 78. End terminals 83 and 84 of the winding 78 are respectively connected to output terminals 33 and 32. A tap 85 of the winding 77 is connected to the terminal 35, to which a reference potential is applied from the deflection and voltage supply circuits 28. In operation, the resonant circuits 69 and 70 are respectively tuned to frequencies somewhat above and somewhat below the oscillator frequency, which may be 3.58 megacycles, for example. The taps 85 and 81 of the windings 77 and 78 are so positioned as to produce the three phase signal components at the output terminals 31, 32 and 33, such terminals being connected to the color control grids 13, 14 and 15 as shown in FIGURE 1. The phase components may be 120° apart, but may preferably have a somewhat different phase relation, when the system is used to reproduce the standard NTSC signal as authorized by the FCC.

Figure 11:
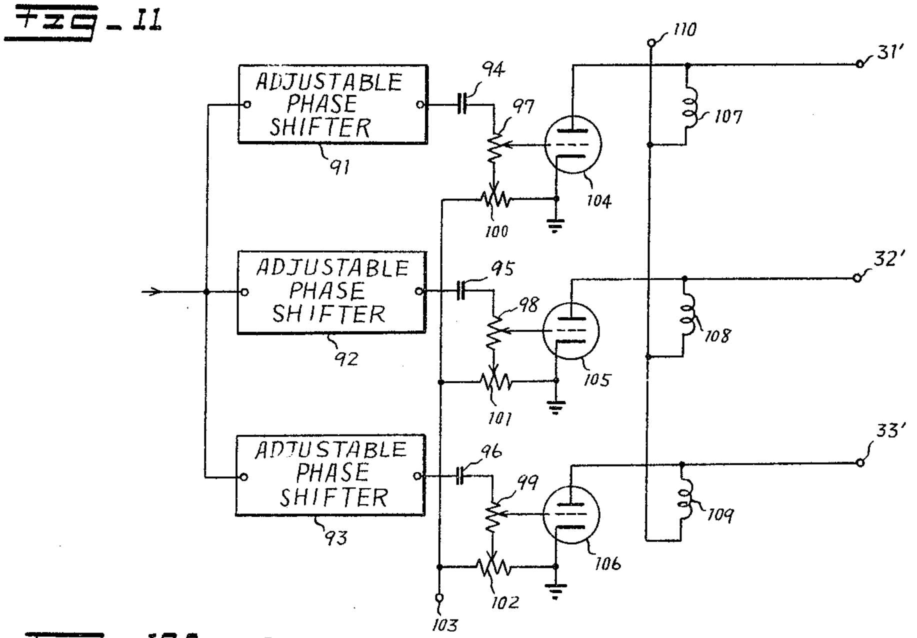
FIGURE 11 is a circuit diagram of another preferred form of three phase circuit usable in the system of FIGURE 1.
Figure 12A:
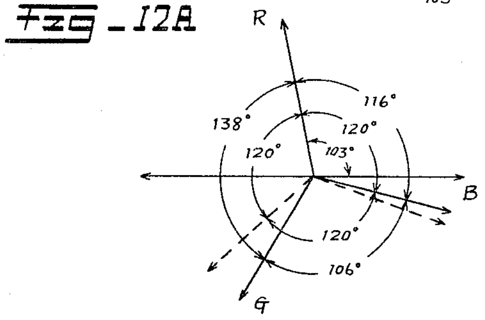
FIGURES 12A and 12B are vector diagrams showing the phase relation of switching signals for color selection in the system of this invention.

FIGURE 12A is a vector diagram showing the relationship of the color components, in the present NTSC signal. With the burst signal as a reference, the red hue is at a position of phase rotation of 103°, the green hue is at a position of phase rotation of 138° from the red hue, and the blue hue is at a position of phase rotation of 106° from the green hue. If the color control signal components are exactly 120° apart, and if the red component of the color control signal applied to the grid 13 coincides with the red hue of the NTSC signal, the control signals applied to the grids 14 and 15 will be at vector positions indicated by the dotted lines in FIGURE 12A and will not coincide with the green and blue components of the NTSC signal. Accordingly, color fidelity will be lost to some extent. It is therefore highly desirable that the phase relationship be adjusted to coincide with the NTSC signal. This can be accomplished by careful placement of the taps 85 and 81 on the windings 77, and careful adjustment of the tuning of the resonant circuits 69 and 70. However, to more readily obtain the desired accuracy, another preferred circuit shown in FIGURE 11 may be used.

Referring to FIGURE 11, a modified three phase circuit 90 is illustrated wherein an input signal from the oscillator 36 is applied to the inputs of three adjustable phase shifters 91, 92 and 93 having outputs connected through coupling capacitors 94, 95 and 96 and through potentiometers 97, 98 and 99 to contacts of additional potentiometers 100, 101 and 102 which are connected between ground and a terminal 103 connected to a suitable bias voltage source. The adjustable contacts of potentiometers 97, 98 and 99 are connected to the control grids of three triodes 104, 105 and 106 having cathodes connected to ground and having anodes connected through inductors 107, 108 and 109 to a terminal 110 which may be connected to the deflection and voltage supply circuits 28, to obtain a reference voltage and to supply the anode-cathode current for the triodes 104–106. The anodes of the triodes 104, 105 and 106 are additionally connected respectively to output terminals 31', 32' and 33', for connection to the color control grids 13, 14 and 15.

Figure 12B:
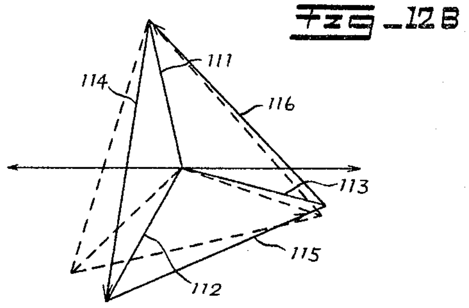

In operation, the phase shifters 91, 92 and 93 are adjusted to obtain the proper phase relation between the signal components applied to the control grids 13, 14 and 15, and the potentiometers 97, 98 and 99 are adjusted to obtain the proper amplitude of the components, while potentiometers 100–102 may be adjusted to obtain the proper bias and reference levels. With reference to the vector diagram of FIGURE 12B, vectors 111, 112 and 113 respectively indicate the voltages from a reference potential point to the grids 13, 14 and 15, the voltages between grids 13 and 14 being shown by the vector 114, the voltage between grids 14 and 15 being shown by the vector 115 and the voltage between grids 15 and 13 being shown by the vector 116. It will be observed that the vector relationship of FIGURE 12B corresponds to that of the NTSC signal, as illustrated in FIGURE 12A. The vector relationship with a 120° phase relation is shown by dotted lines in FIGURE 12B.

According to a further feature of the invention, a keying circuit 120 is provided for applying pulses to the electron gun of the tube 11 to reduce the intensity of or blank out the beam during the white portions of the cycle, to thereby obtain saturated colors, a further specific feature being in the control of the amplitude of the keying pulses in accordance with the saturation of the chrominance signal. Thus when color saturation is high, the keying pulses are applied at high amplitudes to obtain accurate reproduction of vivid colors while when the color saturation is reduced to intermediate or low levels, the keying signals are correspondingly reduced to amplitudes to produce less vivid colors with high accuracy, with increased picture brightness, reduced aberration of the electron beam and increased reproduction of fine picture detail.

Figure 13:
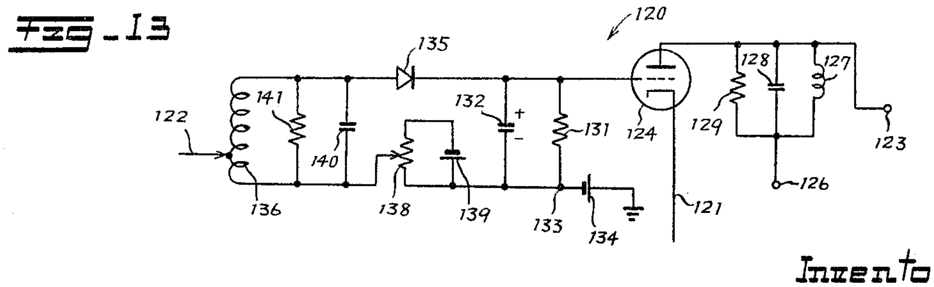
FIGURE 13 is a circuit diagram of a preferred form of keying circuit usable in the system of FIGURE 1.

As shown in FIGURE 1, the keying circuit has one input connected through a line 121 to an output of the oscillator 36, a second input connected through a line 122 to an output of the chrominance signal channel 23, and an output terminal 123 connected to the grid 20. As shown in FIGURE 13, the output terminal 123 is connected to the anode of a triode 124 and through a tank circuit 125 to a terminal 126 to which a B+ voltage is applied from the deflection and voltage supply circuits 28. Tank circuit 125 comprises an inductor 127, a capacitor 128 and a parallel resistor 129, The cathode of the triode 124 is connected through the line 121 to the oscillator 36, wherein it may be connected through a coil to ground, the coil being inductively coupled to a tank circuit of the oscillator to thereby apply a signal at a frequency of 3.58 megacycles in the cathode circuit of the triode 124. Triode 124 is operated nonlinearly and the tank circuit 125 is tuned to the third harmonic frequency, to develop keying pulses at a frequency of approximately 10.7 megacycles, such pulses being applied to the grid 20 to reduce the energy of the electron beam.

The amplitude of the keying pulses is controlled by applying the grid of the triode 124 a D.C. signal proportional to the amplitude of the chrominance signal. In particular, the grid of the triode 124 is connected through the parallel combination of a resistor 131 and a capacitor 132 to a circuit point 133 connected to ground through a bias battery 134. The grid is additionally connected through a diode 135 to one terminal of a coil or inductor 136 having a tap connected through the line 122 to an output of the chrominance signal channel 23. The other terminal of the coil 136 is connected to the movable contact of a potentiometer 138 connected across a battery 139, one terminal of the battery being connected to the circuit point 133. A capacitor 140 is connected in parallel with the inductor 136 to provide a circuit tuned to the mid-frequency of the color signal component, a resistor 141 being additionally connected in parallel to obtain the required band width characteristics.

In operation, the color signal components are rectified by the diode 135 to produce a D.C. signal across the capacitor 132 having a polarity as indicated on the drawing, to move the potential of the grid of the triode 124 in a positive direction in response to increased amplitude of color signal components, and to thereby increase the amplitude of the keying pulses without substantially affecting the shaping thereof.

The battery 139 applies a biasing voltage which regulates the color signal level at which the diode 135 starts to function to develop the control signal, such color signal level being adjustable by means of the potentiometer 138. This feature greatly improves the operation of the circuit, particularly when the level of noise signals is high.

With the system of this invention, the resolution may be increased up to $\frac{4}{3}$ times that obtainable with a two grid type reproducing tube, and brightness may be increased by a factor on the order of $\frac{3}{4}$ times that possible in other systems, without however causing blooming.

It will be understood that modifications and variations may be effected without departing from the spirit and scope of the novel concepts of this invention.

What we claim is:

1. In a color television reproducing system, a cathode ray tube including an electron gun for producing an electron beam, means for deflecting said beam, color control grids each having spaced parallel elements in interleaved relation to the elements of the other grids, and a screen adjacent said grids having red, green and blue phosphor strips in parallel relation to said grid elements, a white color being produced from a balanced excitation of the strips of all three colors, means for applying a three phase color control signal to said grids, said grid elements and phosphor strips being arranged to produce colors in the sequence red-white-green-white-blue-white-red-white-green-white-blue-white . . . as said three phase color signal is applied.

2. In a color television reproducing system, a cathode ray tube including an electron gun for producing an electron beam, means for deflecting said beam, color control grids each having spaced parallel elements in interleaved relation to the elements of the other grids, and a screen adjacent said grids having red, green and blue phosphor strips in parallel relation to said grid elements, a white color being produced from a balanced excitation of the strips of all three colors, means for applying a three phase color control signal to said grids, said grid elements and phosphor strips being arranged to produce colors in the sequence red-white-green-white-blue-white-red-white-green-white-blue-white . . . as said three phase color signal is applied, and means for applying to said electron gun a keying signal at a frequency equal to three times the frequency of said color control signal and so phased as to reduce the intensity of said beam during the white portions of each cycle of said color control signal.

3. In a color television reproducing system, a cathode ray tube including an electron gun for producing an electron beam, means for deflecting said beam, color control grids each having spaced parallel elements in interleaved relation to the elements of the other grids, and a screen adjacent said grids having red, green and blue phosphor strips in parallel relation to said grid elements, a white color being produced from a balanced excitation of the strips of all three colors, means for applying a three phase color control signal to said grids, said grid elements and phosphor strips being arranged to produce colors in the sequence red-white-green-white-blue-white-red-white-green-white-blue-white . . . as said three phase color signal is applied, means for applying to said electron gun a keying signal at a frequency equal to three times the frequency of said color control signal and so phased as to reduce the intensity of said beam during the white portions of each cycle of said color control signal, and means for modulating the amplitude of said keying signal in proportion to chrominance components of a color television signal.

4. In a color television reproducing system, a cathode ray tube including an electron gun for producing an electron beam, means for deflecting said beam, first, second and third color control grids having spaced parallel elements with the elements of said second grid being disposed intermediate the elements of said first and third grids and with the elements of said third grid being disposed intermediate the elements of said second and first grids, a screen adjacent said grids having red phosphor strips disposed adjacent the elements of said first grid, blue phosphor strips disposed adjacent the elements of said second grid, and green phosphor strips disposed adjacent the elements of said third grid, and means for applying a three phase color control signal to said grids, said signal, said grid elements and said phosphor strips being so related as to produce color in the sequence red-white - green - white - blue - white - red - white - green-white - blue - white . . . as said three phase color control signal is applied.

5. In a color television reproducing system, a cathode ray tube including an electron gun for producing an electron beam, means for deflecting said beam, first, second and third color control grids having spaced parallel elements with the elements of said second grid being disposed intermediate the elements of said first and third grids and with the elements of said third grid being disposed intermediate the elements of said second and first grids, and a screen adjacent said grids having a first series of red phosphor strips adjacent the elements of said first grid, a first series of blue phosphor strips adjacent the elements of said second grid, and a first series of green phosphor strips adjacent the elements of said third grid, a second series of red phosphor strips intermediate the blue and green phosphor strips of said first series, a second series of blue phosphor strips intermediate the green and red strips of said first series, and a second series of green phosphor strips intermediate the red and blue phosphor strips of said first series, and means for applying a three phase color control signal to said grids.

6. In a color television reproducing system, a cathode ray tube including an electron gun for producing an electron beam, means for deflecting said beam, color control grids each having spaced parallel elements in interleaved relation to the elements of the other grids, and a screen adjacent said grids having red, green and blue phosphor strips in parallel relation to said grid elements, a white color being produced from a balanced excitation of the strips of all three colors, means for applying a three phase color control signal to said grids, said grid elements and phosphor strips being arranged to produce colors in the sequence red-white-green-white-blue-white-red-white-green-white-blue-white . . . as said three phase color signal is applied, said color control signal including three phase components with a 120° phase relation therebetween.

7. In a color television reproducing system, a cathode ray tube including an electron gun for producing an electron beam, means for deflecting said beam, color control grids each having spaced parallel elements in interleaved relation to the elements of the other grids, and a screen adjacent said grids having red, green and blue phosphor strips in parallel relation to said grid elements, a white color being produced from a balanced excitation of the strips of all three colors, means for applying a three phase color control signal to said grids, said grid elements and phosphor strips being arranged to produce colors in the sequence red-white-green-white-blue-white-red-white-green-white-blue-white . . . as said three phase color signal is applied, said color control signal including three phase components with phase differences of 116°, 138° and 106° respectively.

8. In a color television reproducing system, a cathode ray tube including an electron gun for producing an electron beam, means for deflecting said beam, color control grids each having spaced parallel elements in interleaved relation to the elements of the other grids, and a screen adjacent said grids having red, green and blue phosphor strips in parallel relation to said grid elements, a white color being produced from a balanced excitation of the strips of all three colors, means for applying a three phase color control signal to said grids, said grid elements and phosphor strips being arranged to produce colors in the sequence red-white-green-white-blue-white-red-white-green-white-blue-white . . . as said three phase color signal is applied, said three phase color control signal including three phase components of substantially the same amplitude respectively applied to said three color control grids.

9. In a color television system, means for supplying a composite color television signal including a luminance component and color components on phases of a sub-carrier wave, means for generating a control signal at the frequency of the sub-carrier wave and synchronized therewith, a reproducing tube including an electron gun for producing an electron beam, means for deflecting said beam, three color control grids each having spaced parallel elements in interleaved relation to the elements of the other grids, a screen adjacent said grids having red, green and blue phosphor strips in parallel relation to said grid elements, a white color being produced from a balanced excitation of the strips of all three colors, means responsive to said control signal for applying three phase components thereof to said color control grids, said grid elements and phosphor strips being arranged to produce color in the sequence red-white-green-white-blue-white-red-white-green-white-blue-white . . . , and means for applying to said electron gun a keying signal at a frequency equal to three times the frequency of said control signal for reducing the intensity of said beam during the white portions of each cycle of said color control signal.

References Cited by the Examiner

UNITED STATES PATENTS

| | | | |
|---|---|---|---|
| 2,860,271 | 11/1958 | Sandor | 178—5.4 |
| 3,084,212 | 4/1963 | Raibourn | 178—5.4 |
| 3,176,185 | 3/1965 | Inaba et al. | 178—5.4 |

DAVID G. REDINBAUGH, *Primary Examiner.*

J. A. O'BRIEN, *Assistant Examiner.*